United States Patent
Tao et al.

(10) Patent No.: US 10,915,399 B2
(45) Date of Patent: Feb. 9, 2021

(54) STORAGE SYSTEM WITH ERROR RECOVERY MECHANISM AND METHOD OF OPERATION THEREOF

(71) Applicant: CNEX LABS, Inc., San Jose, CA (US)

(72) Inventors: Jun Tao, Ladera Ranch, CA (US); Chih-Chieng Cheng, Cupertino, CA (US); Bo Jiang, Shanghai (CN); Shanying Luo, Fremont, CA (US)

(73) Assignee: CNEX LABS, Inc., San Jose, CA (US)

(*) Notice: Subject to any disclaimer, the term of this patent is extended or adjusted under 35 U.S.C. 154(b) by 0 days.

(21) Appl. No.: 16/440,588

(22) Filed: Jun. 13, 2019

(65) Prior Publication Data
US 2020/0394105 A1  Dec. 17, 2020

(51) Int. Cl.
G06F 11/10 (2006.01)
G06F 3/06 (2006.01)
G06F 11/07 (2006.01)
G06F 11/20 (2006.01)

(52) U.S. Cl.
CPC ........ *G06F 11/1076* (2013.01); *G06F 3/0619* (2013.01); *G06F 3/0631* (2013.01); *G06F 3/0635* (2013.01); *G06F 3/0689* (2013.01); *G06F 11/0793* (2013.01); *G06F 11/2053* (2013.01)

(58) Field of Classification Search
CPC .. G06F 11/1076; G06F 3/0619; G06F 3/0631; G06F 3/0635; G06F 3/0689; G06F 11/0793; G06F 11/2053
See application file for complete search history.

(56) References Cited

U.S. PATENT DOCUMENTS

| | | | |
|---|---|---|---|
| 6,640,327 B1 | 10/2003 | Hallberg | |
| 8,627,188 B2 | 1/2014 | Weingarten et al. | |
| 8,832,524 B2 | 9/2014 | Bennett | |
| 9,015,561 B1* | 4/2015 | Hu | G11C 16/0483 |
| | | | 714/773 |
| 9,124,300 B2 | 9/2015 | Sharon et al. | |
| 2009/0132875 A1* | 5/2009 | Kitahara | G06F 11/1068 |
| | | | 714/721 |
| 2010/0251012 A1* | 9/2010 | Zwisler | G06F 11/1092 |
| | | | 714/6.32 |
| 2013/0080862 A1 | 3/2013 | Bennett | |
| 2013/0104005 A1 | 4/2013 | Weingarten et al. | |
| 2013/0106803 A1 | 5/2013 | Tan | |
| 2014/0245098 A1 | 8/2014 | Sharon et al. | |
| 2018/0203625 A1* | 7/2018 | Zhang | H03M 13/611 |

* cited by examiner

*Primary Examiner* — Kyle Vallecillo
(74) *Attorney, Agent, or Firm* — Perspectives Law Group, Corp.

(57) ABSTRACT

A storage system includes: a control processor, configured to: read user data with a read threshold, detect an uncorrectable error in the user data, detect a sector balanced when the number of 1's and 0's in the user data is within the difference stored in a range register, apply an XOR RAID recovery to correct the uncorrectable error in the user data; and a non-volatile memory array, coupled to the control processor, configured to store the user data; and wherein the control processor is further configured to forego an additional read of a sector N with a different value of the read threshold when the sector balanced initiates the XOR RAID recovery.

20 Claims, 5 Drawing Sheets

STORAGE SYSTEM WITH ERROR RECOVERY MECHANISM AND METHOD OF OPERATION THEREOF

TECHNICAL FIELD

An embodiment of the present invention relates generally to a storage system, and more particularly to a system for error recovery processing.

BACKGROUND

Non-volatile memory, such as NAND flash, has driven massive increases in capacity and verification processes to support intelligent devices. In order to reduce the cost per gigabyte nonvolatile memories, these devices have become denser by packing more data in the same silicon area, by scaling the size of the flash cells, adding three dimensional arrays of storage cells, and storing more bits in each of them, but the changes in cell-size and storage cell configuration has come at the cost of read back reliability. In order to manage the multiple bits per cell, the adjustment of the read threshold voltage has become critical and time consuming. As the voltage level of adjacent cells becomes closer, a means for quickly identify the data stored in each cell becomes more problematic. As read recovery retries increase, performance can be adversely impacted and system performance degraded.

Thus, a need still remains for a storage system with error recovery mechanism to provide improved data reliability and minimize read access times. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including a control processor, configured to: read user data with a read threshold, detect an uncorrectable error in the user data, detect a sector balanced when the number of 1's and 0's in the user data is within the difference stored in a range register, apply an XOR RAID recovery to correct the uncorrectable error in the user data; and a non-volatile memory array, coupled to the control processor, configured to store the user data; and wherein the control processor is further configured to forego an additional read of a sector N with a different value of the read threshold when the sector balanced initiates the XOR RAID recovery.

An embodiment of the present invention provides a method including: reading user data from a non-volatile memory array using a read threshold; detecting an uncorrectable error in the user data; detecting a sector balanced when the number of 1's and 0's in the user data is within the difference stored in a range register; applying an XOR RAID recovery to correct the uncorrectable error in the user data; and foregoing an additional read of a sector N with a different value of the read threshold when the sector balanced initiates the XOR RAID recovery.

An embodiment of the present invention provides a non-transitory computer readable medium including instructions for execution including: reading user data from a non-volatile memory array using a read threshold; detecting an uncorrectable error in the user data; detecting a sector balanced when the number of 1's and 0's in the user data is within the difference stored in a range register; applying an XOR RAID recovery to correct the uncorrectable error in the user data; and foregoing an additional read of a sector N with a different value of the read threshold when the sector balanced initiates the XOR RAID recovery.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
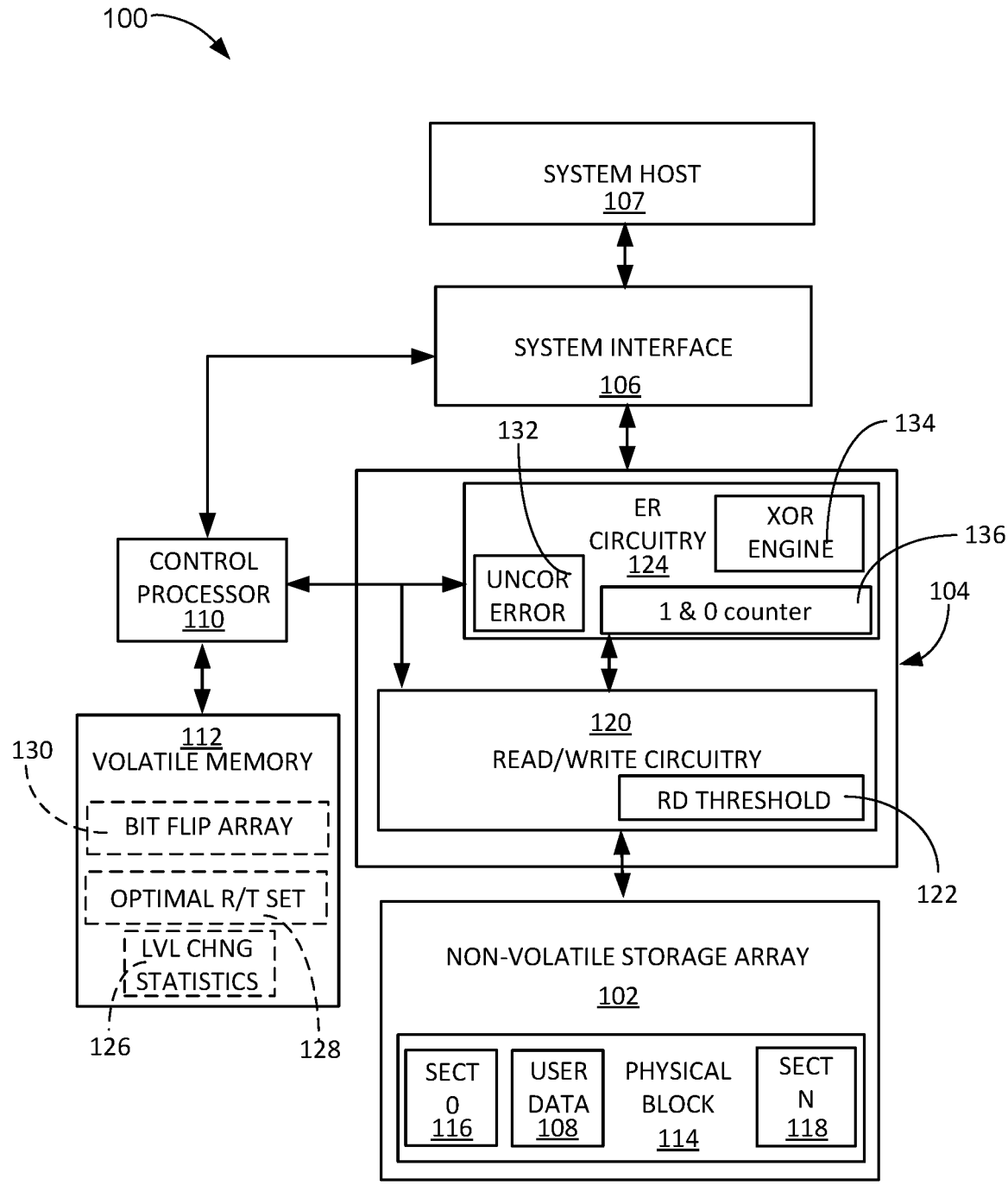
FIG. 1 is a block diagram of a storage system with error recovery mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include hardware or hardware supported by software in an embodiment of the present invention in accordance with the context in which the term is used. For example, the software can be machine code, firmware, embedded code, and application software. Also for example, the hardware can be circuitry, processor, computer, integrated circuit, integrated circuit cores, application specific integrated circuit (ASIC), passive devices, or a combination thereof.

As an example, one method to reduce the time spent in error recovery is to apply a read threshold mechanism to predict the optimum read threshold of a storage page and adjust it for the usable storage before the errors become unrecoverable.

Referring now to FIG. 1, therein is shown a functional block diagram of a storage system 100 with error recovery mechanism in an embodiment of the present invention. The functional block diagram of the storage system 100 depicts a non-volatile memory array 102 coupled to a read/write channel 104. A system interface 106 transfers user data 108 to and from the non-volatile memory array 102. The system interface 106 can execute the movement of the user data 108 into and out of the storage system 100. As an example, the system interface 106 can transfer user data 108 through the read/write channel 104 for storage to and retrieval from the non-volatile memory array 102.

A control processor 110 can provide at least a portion of the computation resource for the storage system 100. The control processor 110 can coordinate the operation of the storage system 100. As an example, the control processor 110 can be coupled to the system interface 106, the read channel 104, and a volatile memory 112.

The volatile memory 112 provides at least a portion of the storage of information for the storage system 100. As examples, the volatile memory 112 can be a volatile memory array, such as a matrix of interconnected volatile memory integrated circuits including dynamic random access memory (DRAM), static random access memory (SRAM), register files, non-volatile memory, or a combination thereof, coupled to the control processor 110.

The system interface 106 can be supported by the control processor 110. The control processor 110 can be implemented with hardware circuitry in a number of different manners. For example, the control processor 110 can be a processor, an application specific integrated circuit (ASIC), an embedded processor, a microprocessor, a hardware control logic, a hardware finite state machine (FSM), a digital signal processor (DSP), or a combination thereof. The system interface 106 can be implemented as a hardware control logic, a hardware finite state machine (FSM), or a programmable bus controller, that can provide data transport between the non-volatile memory array 102 and a system host 107.

The system host 107 can be a computer, a processor, a processor core, a device controller, or a combination thereof configured to generate, store, and retrieve the user data 108. The host system 107 can be directly coupled to the system interface 106, or it can be attached through a local bus, a local area network (LAN), or wide area network (WAN).

The non-volatile memory array 102 can be a matrix of interconnected non-volatile memory integrated circuits, such as NAND flash array of single level cells (SLC) or multi-level cells (MLC) or another non-volatile memory technology. The non-volatile memory array 102 can be a remote resource, such as a NAND flash based network attached storage (NAS), storage area network (SAN), or a combination thereof. The cells in the non-volatile memory array 102 are organized into a plurality of physical blocks 114. Each of the physical blocks 114 can contain data sectors from sector 0 116 through sector N 118. Where the sector can be a read/write unit sector, a physical page, a word line, or a physical block.

The read/write channel 104 can be a hardware structure that can be supported by software, to encode and decode the user data 108 for storage in the non-volatile memory array 102. A read/write circuitry 120 can manage the writing to the sector 0 116 through sector N 118. During the reading of the user data 108, the read/write circuitry 120 can manipulate a read threshold 122 in order to adjust for errors detected by an error recovery (ER) circuitry 124. The control processor 110 can collect a count of the read data level changes as the read threshold 122 is changed. The control processor 110 can maintain the count of level change statistics 126 indicating that a bit flip in the user data 108 caused by a level change has occurred on any of the read thresholds 122, which can be stored in the volatile memory 112.

The control processor 110 can adjust the read threshold 122, of the sector 0 116 through sector N 118, based on the read threshold mechanism of the level change statistics 126, such as the bit flip count or information indicating a change in the data level between adjacent values of the read threshold 122, in order to maintain the operational performance of the currently addressed sector in the physical block 114.

The control processor 110 can manage the operation of the read/write channel 104 including performing calculations, optimizing the read threshold 122, and execution of interface commands delivered from the host system 107. The control processor 110 can provide the level change statistics 126 when reading the user data 108. The ER circuitry 124 can be a hardware structure used to encode intended or targeted data for providing error protection, error detection, error correction, redundancy, or a combination thereof.

The ER circuitry 124 can include an XOR engine 134 that can generate the parity for multiple the sector 0 116 through sector N 118. The XOR engine 134 can be a hardware matrix capable of generating RAID parity across multiple of the sector 0 116 through sector N 118. During read processing the XOR engine 134 can regenerate data that is missing or corrupted from the sector 0 116 through sector N 118 by applying the RAID parity. The ER circuitry 124 can also include a 1 and 0 counter 136. The 1 and 0 counter 136 can be a hardware structure that can monitor the state of the individual data bits of the selected one of the sector 0 116 through sector N 118 while processing the read data. During the analysis of the read threshold 122, the control processor 110 can read the user data 108, without enabling the ER circuitry 124 to perform error correction on the data, in order to capture each instance of a level change in the user data 108. The control processor 110 can also read the output of the 1 and 0 counter 136 to determine whether the last read attempt provided a balanced number of 1's and 0's in the data pattern.

The read threshold 122 is defined as selectable voltage reference used when reading the stored value in the sector 0 116 through sector N 118. The read threshold 122 can provide the voltage reference in incremental steps. By way of an example, the read threshold can have 128 linear steps that set the reference voltage for each of the design point voltage levels for the ideal read-back cell. The TLC NAND will have 7 major bit thresholds, {A, B, C, D, E, F, G}. The 128 steps available can be centered on each of the 7 major thresholds. This can be compared to QLC NAND, which has 15 major thresholds, and 128 steps applied to each.

It is understood that the read of any of the sector 0 116 through sector N 118 using each of the possible settings of the read threshold 122, can subject the selected one of the sector 0 116 through sector N 118 to hundreds or thousands of read operations. The full analysis of the read threshold 122 can further damage an already impaired version of the sector 0 116 through sector N 118 due to the reads depleting the charge of the stored data.

The storage system 100 can generate an optimal read threshold set 128 by performing multiple reads of the user data 108 with stepped values of the read threshold 122. Between reads the read threshold 122 can be incremented and the resulting data compared. By detecting and logging the number of bits that change value on each incremental step, a bit flip array 130 can be constructed. The bit flip array can be a matrix of the number of level changes counted for each selected offset step count for each of the read threshold 122 {A, B, C, D, E, F, G}. The control processor 110 can search the bit flip array 130 for the offset values that represents the minimum number of changed bits for each of the read threshold 122 {A, B, C, D, E, F, G}. These offset values represent the optimal read threshold set 128, which can provide the best possibility of correctly reading the user data 108 without detecting an uncorrectable error 132. It is understood that the uncorrectable error 132 is a data error that contains too many bit errors for the ER circuitry 124 to correct the user data 108 without additional read processing.

A large number of program and erase (P/E) cycles can cause the voltage of the cells holding the user data 108 to deviate from expected ranges after programming. Read disturbs, which refers to a significant amount of read operation on the sector 0 116 through sector N 118 of the physical block 114, will also cause the physical block 114 to shift to a higher voltage range. Therefore, it is extremely critical to calculate the optimal read threshold set 128, which provide the smallest number of read errors.

As the sector 0 116 through sector N 118 are repeatedly accessed, the voltage level of the user data 108 can shift making the valid settings for the read threshold 122 change over time. It is understood that the read threshold 122 can be adjusted dynamically based on the level change statistics 126 detected by the ER circuitry 124. The detection of the uncorrectable error 132 can cause the regeneration of the bit flip array 130 and selection of a new set of the optimal read threshold set 128 in order to better read the non-volatile memory array 102. In order to alleviate the additional number of reads required to correct the data read from and of the sector 0 116 through sector N 118, the control processor 110 can monitor the 1 and 0 counter to determine whether there is a balance in the data pattern. If the 1 and 0 counter 136 indicates a balanced data set, the control processor 110 can forego the remainder of the read retries and initiate the XOR engine 134 to perform a RAID parity correction of the user data 108. The decision to forego the remainder of the read retries can prevent further shifting of the data stored in the sector 0 116 through sector N 118.

For illustrative purposes, the storage system 100 will be described as utilizing the error correction mechanism in storing and accessing information with NAND flash memory. However, it is understood that the storage system 100 can utilize the error correction mechanism with other types of memory, such as resistive non-volatile memory, other types of flash or non-volatile memory, or a combination thereof.

It is understood that the embodiment discussed above is used to describe the invention and other embodiments are possible. Another possible embodiment can integrate the control processor 110, the read/write channel 104, the system interface 106, the non-volatile memory array 102, or a combination thereof into a single circuit.

It has been discovered that the control processor 110 can proactively map the optimal read threshold set 128 for the sector 0 116 through sector N 118 in the physical block 114. This can allow the ER circuitry 124 to calculate the level change statistics 126 for further monitoring the read reliability of the sector 0 116 through sector N 118 and forego the remainder of the read retries as soon as the 1 and 0 counter 136 indicates a balanced data sector has been read. The early termination of the read retries can reduce the voltage shifting caused by read disturb performed during the read retries. The control processor 110 can then invoke the XOR engine 134 to perform the RAID parity correction of the user data 108 without performing additional reads of the sector 0 116 through sector N 118 having the uncorrectable error 132.

Figure 2:
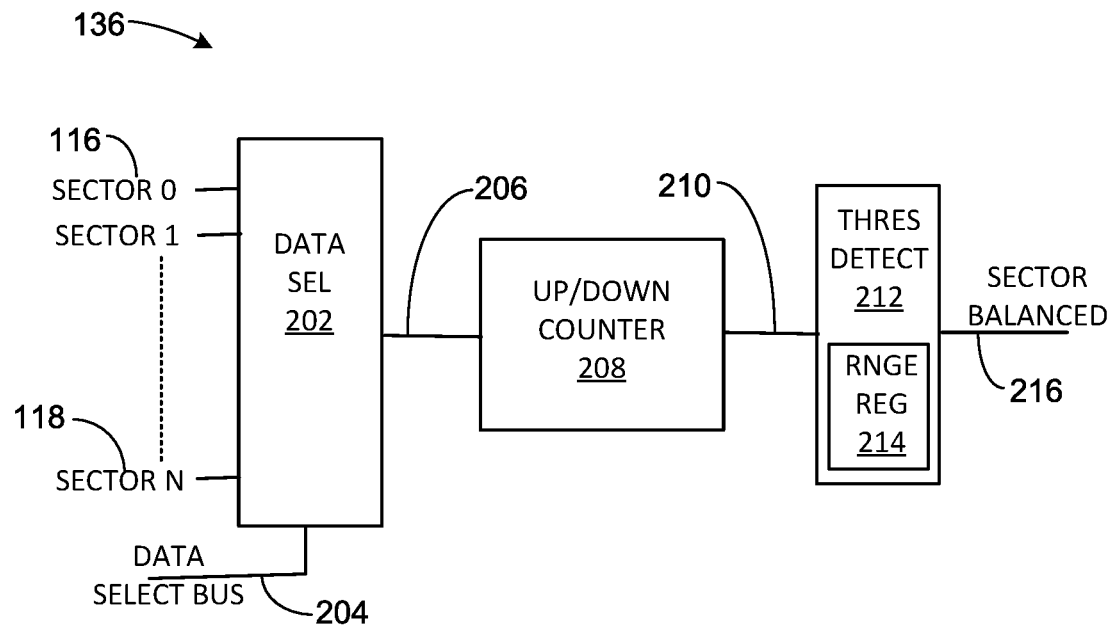
FIG. 2 depicts a functional block diagram of a 1 and 0 counter in an embodiment.

Referring now to FIG. 2, therein is a functional block diagram of a 1 and 0 counter 136 in an embodiment. The functional block diagram of a 1 and 0 counter 136 depicts the sector 0 116 through sector N 118 coupled to a data selector 202. The data selector 202 can be a hardware multiplexer controlled by the control processor 110 of FIG. 1 through a data select bus 204. The data selector 202 can pass the user data 108 of FIG. 1 present on the input coupled to the sector 0 116 through sector N 118 based on the address of the data select bus 204.

A selected channel data 206, output from the data selector 202, can be input to an up/down counter 208. The up/down counter 208 can be a hardware structure that can increment or decrement based on a data bit detected as a 1 or 0 respectively. It would be understood that a correctly read one of the sector 0 116 through sector N 118 would result in the counter ending at a count of zero because there are the same number of 1's and 0's in the selected channel data 206. When the selected channel data 206 does not contain the same number of 1's and 0's, the up/down counter 208 will indicate a residual count 210 that is not equal to zero.

It is understood that the detection of the uncorrectable error 132 of FIG. 1 indicates that there are more error bits in the selected one of the sector 0 116 through sector N 118 that can be corrected by ER circuitry 124 of FIG. 1 performing error correction of the selected channel data 206 without additional information. During the error recovery process, the control processor 110 of FIG. 1 can adjust the read threshold 122 of FIG. 1 in order to increase the possibility of correcting the user data 108 presented on the selected channel data 206. In some cases, the adjustment of the read threshold 122 will not improve the likelihood of correcting the user data 108 presented on the selected channel data 206. In this event, other means must be employed to correct the user data 108.

The residual count 210 can be an indication that the read threshold 122 used to access the user data 108 might be corrected by the application of RAID parity when the control processor 110 invokes the XOR engine 134 of FIG. 1 without performing additional read retries of the uncorrectable error 132. The residual count 210 can be coupled to a threshold detector 212 that can verify the range of correction capabilities of the XOR engine 134. The threshold detector can be a hardware comparator with a range register 214 that is loaded by the control processor 110 to indicate the range of correction capabilities of the XOR engine 134. When the residual count 210, representing the difference in the count of 0's and the count of 1's, is less than or equal to the value contained in the range register 214, a sector balanced 216 indicates the user data 108 can be corrected by the XOR engine 134 applying RAID parity to the sector N 118 containing the uncorrectable data error 132.

When the residual count 210 is greater than the value contained in the range register 214, the balanced sector indicator is not set and the control processor 110 must continue to adjust the read threshold 122 in order to optimize the user data 108 that can be recovered by further read retries. The ability to detect when the read threshold 122 is close enough without being able to correctly read the selected one of the sector 0 116 through sector N 118, can reduce the number of the read disturbs that are applied to the sector 0 116 through sector N 118 that contains the uncorrectable error 132.

It has been discovered that the application of the 1 and 0 counter 136 can provide a shortened error recovery process and reduce the number of the read retries that are applied to the selected one of the sector 0 116 through sector N 118 that contains the uncorrectable error 132. The resulting recovery process can improve the performance of the system host 107 of FIG. 1, while extending the useable life of the non-volatile storage array 102 of FIG. 1.

Figure 3:
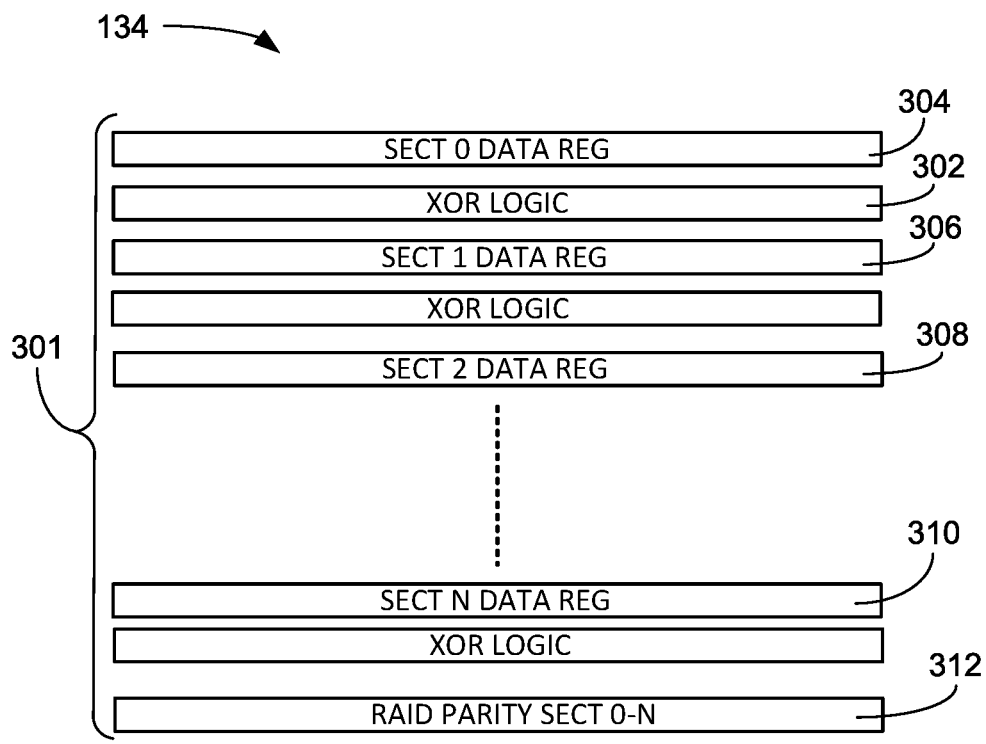
FIG. 3 is a functional block diagram of an XOR engine in an embodiment.

Referring now to FIG. 3, therein is shown a functional block diagram of an XOR engine in an embodiment. The functional block diagram of an XOR engine 134 depicts a register array 301. The register array 301 can be a hardware register file with interconnecting instances of XOR logic 302 coupling the individual bits of a sector 0 data register 304, a sector 1 data register 306, a sector 2 data register 308, and a sector N data register 310. The XOR logic 302 can be a hardware structure configurable to sample the contents of the sector 0 data register 304, the sector 1 data register 306, the sector 2 data register 308, and the sector N data register 310. The XOR logic 302 can implemented to generate a RAID parity sector 0N 312 or load a stored version of the RAID parity sector 0-N 312 in order to correct the uncorrectable error 132 of FIG. 1 loaded in the sector 0 data register 304 through the sector N data register 310.

The sector 0 data register 304, the sector 1 data register 306, the sector 2 data register 308, and the sector N data register 310 are each a hardware register file capable of loading the data contents of sector 0 116 of FIG. 1 through sector N 118 of FIG. 1 for verification of the user data 108 of FIG. 1. By way of an example, if the uncorrectable error 132 is detected in the sector 2 data register 308, the XOR engine 134 can be configured to correct the errors by loading the stored version of the RAID parity sector 0-N 312 and loading the sector 0 data register 304, the sector 1 data register 306, and the sector N data register 310 with the previously written data. The XOR logic 304 can be configured sample the data bits of the sector 0 data register 304 through the sector N data register 310 and the RAID parity sector 0-N 312 while excluding the contents of the sector 2 data register 308 containing the uncorrectable error 132. The XOR engine 134 can reconstruct the corrected contents of the sector 2 data register 308 without the uncorrectable error 132.

Since the control processor 110 can shorten the read recovery time and address the uncorrectable error 132 without performing read retries with all possibilities of the read threshold 122, the number of read disturbs can be reduced and the data reliability can be maintained. It is understood that the application of the XOR engine 134 can shorten the time required to address the uncorrectable error 132 as well as reduce the further damage to the data caused by repeatedly reading the sector 2 data with all possible values of the read threshold 122.

It has been discovered that the application of the XOR engine 134 can reduce the recovery time of the uncorrectable error 132 as well as extend the useful life of the non-volatile storage array 102 of FIG. 1. The control processor 110 can configure the XOR engine to generate the RAID parity sector 0-N 312 to be stored with the physical block 114 of FIG. 1 or load the previously stored version of the RAID parity sector 0-N 312 to correct the uncorrectable error 132 within one of the sector 0 116 through sector N 118. By reducing the number of read retries performed on the sector 0 116 through sector N 118, the user data 108 is subjected to less damage caused by shifting voltages. This can make a significant difference when the non-volatile storage array 102 is near the end of its useful life. The application of the XOR engine 134 over the entire life cycle of the non-volatile storage array 102 will significantly extend the life of the non-volatile storage array 102 and increase the performance of the storage system 100 of FIG. 1.

Figure 4:
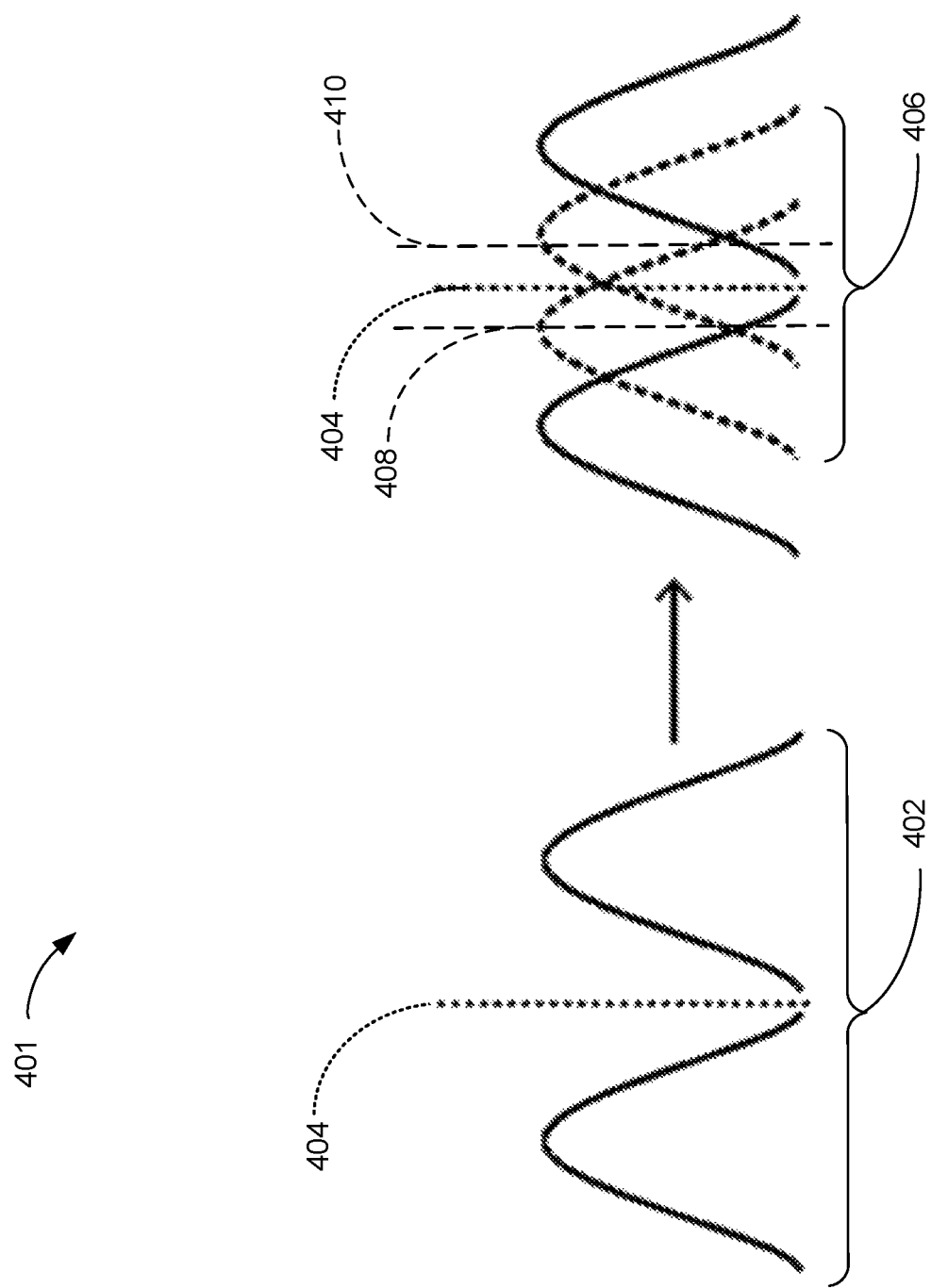
FIG. 4 is a graphical view of an exemplary access of a cell of a non-volatile memory with the uncorrectable error.

Referring now to FIG. 4, therein is shown a graphical view of an exemplary access 401 of a cell of a non-volatile memory with the uncorrectable error 132 of FIG. 1. The graphical view of an exemplary access 401 of the cell of the non-volatile memory depicts a data distribution 402 as written to a cell in the physical block 114 of FIG. 1. A default threshold 404 can be set by the control processor 110 of FIG. 1 based on the age and condition of the non-volatile storage array 102 of FIG. 1. The pattern of the data distribution 402, as shown on the left side of the FIG. 4 can be read without errors.

Over time and through use of the non-volatile storage array 102, the distribution can be compressed or altered as shown in a used data distribution 406 (dashed line pattern). The default threshold 404 is not useful to determine the data content of the non-volatile memory cell. A first offset threshold 408 is not useful in reading the content of the non-volatile memory cell due to the compressed state of the used data distribution 406. A second offset threshold 410 is also not useful to determine the data content of the non-volatile memory cell. This type of data compression can be present in NAND flash devices that are near the end of life. It is clear that no matter how the read threshold 122 of FIG. 1 can be adjusted, the resulting data will be incorrect. This type of error can be corrected by the control processor 110 invoking the XOR engine 134 of FIG. 1 to perform the correction.

It is understood that any adjustment of the read threshold 122 will not be effective to correctly read the used data distribution 406. If the control processor 110 was to use the standard read retries to attempt to access the user data 108 of FIG. 1, the non-volatile memory cell could be subjected to hundreds of reads that do not have the potential for success reading, which can further damage the used data distribution 406. This type of data corruption can be caused by repeated read retries with different levels of the read threshold 122. By allowing the control processor to invoke the XOR engine 134 of FIG. 1 for data correction, the number of read retries can be significantly reduced and the likelihood of the compression of the used data distribution 406 can be prevented.

Figure 5:
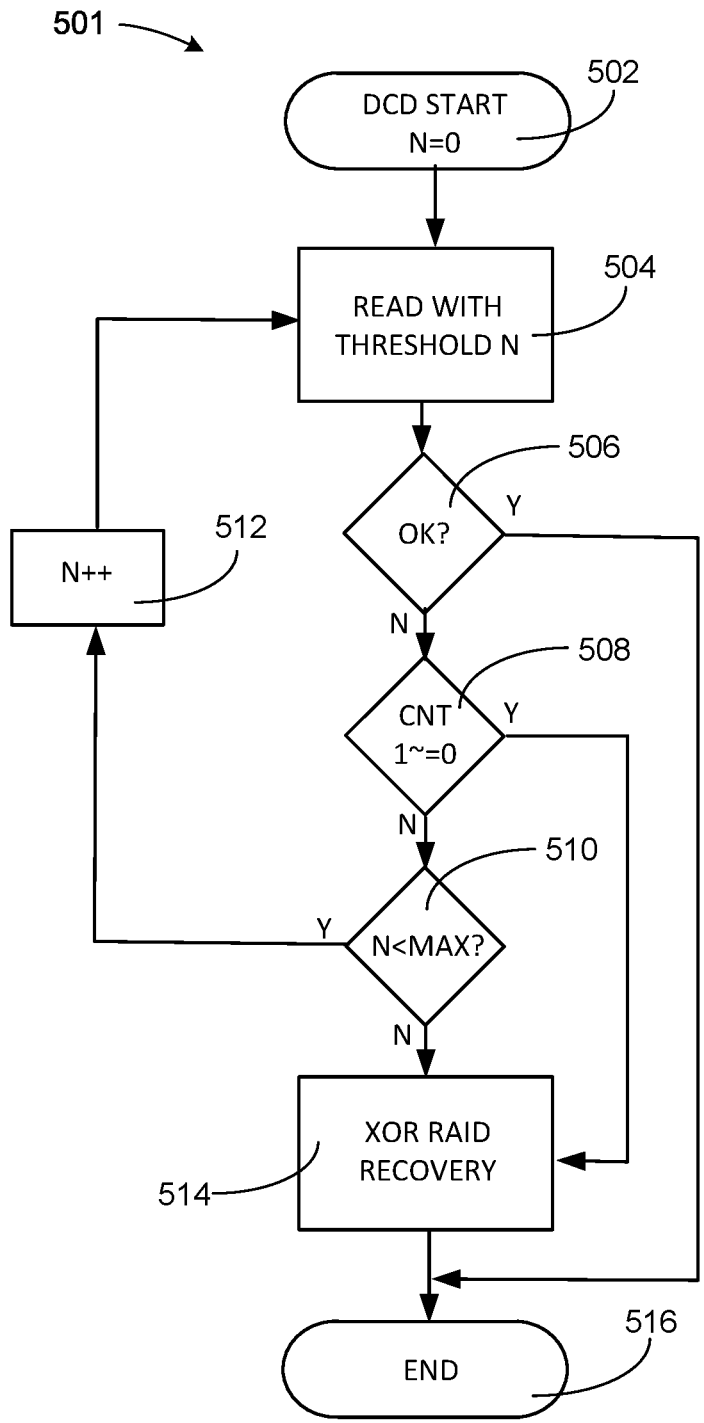
FIG. 5 is an operational flow diagram of the storage system with error recovery mechanism in an embodiment of the present invention.

Referring now to FIG. 5, therein is shown an operational flow diagram 501 of the storage system 100 with error recovery mechanism in an embodiment of the present invention. It is understood that the functions described in this application can be implemented as instructions stored on a non-transitory computer readable medium to be executed by a host processor (not shown), the control processor unit 110 of FIG. 1, a math co-processor, a processor core, or a combination thereof.

The non-transitory computer readable medium can include compact disk (CD), digital video disk (DVD), or universal serial bus (USB) flash memory devices. The non-transitory computer readable medium can be integrated as a part of a host system not shown or installed as non-volatile memory array 102 of the storage system 100.

The non-transitory computer readable medium can include instructions required to perform the operations of "decode start with initial threshold" 502. The first selection of the read threshold 122 of FIG. 1 can be the default threshold 404 of FIG. 4. The user data 108 of FIG. 1 read with the initial value of the read threshold 122 can be a baseline for further analysis.

The flow can include "read user data with a current read threshold" 504, in which the control processor 110 of FIG. 1 can configure the read/write circuitry 120 of FIG. 1 to access the user data 108 using the current value of the read threshold 122.

The flow includes "check for data OK" 506, the control processor 110 can monitor the occurrence of any of the uncorrectable error 132 of FIG. 1 in the user data 108. The control processor can configure the error recovery circuitry 124 of FIG. 1 to correct any of the correctable errors on-the-fly with no further reading of the user data 108. If the uncorrectable error 132 is not detected and the user data 108 is correctable, the flow proceeds to an "end of recovery process" 516 to conclude the processing of the user data 108. If however the control processor 110 does detect the uncorrectable error 132 in the user data 108, the flow proceeds to a "count of 1's approximately equal to the count of 0's" 508 for further processing.

The flow includes the "count of 1's approximately equal to the count of 0's" 508, where the control processor 110 can access the 1 and 0 counter 136 of FIG. 1 to determine whether the user data 108 has approximately the same number of 1's and 0's in the sector. The control processor 110 can load the range register 214 in the 1 and 0 counter 136 that can activate the detection of the sector balanced 216 of FIG. 2. If the sector balanced 216 is active, the number of 1's and 0's is within the range established by the control processor 110 loading the range register 214. When the sector balanced 216 is activated, the control processor 110 can forego the remainder of the threshold adjustment and read retries of the user data 108. The flow proceeds to an "XOR RAID recovery" 514 to correct the user data 108.

The "XOR RAID recovery" 514 provides the control processor 110 can activate the XOR engine 134 to perform the correction of the user data 108. The control processor 110 can load the previously generated RAID parity sector 0-N 312 of FIG. 3 and the sector 0 data register 304 through the sector N data register, including the sector containing the uncorrectable error 132 in the XOR engine 134. The control processor 110 can immediately perform the RAID error recovery to restore the user data 108 and reduce the decoding latency of the non-volatile storage array 102. If the "count of 1's approximately equal to the count of 0's" 508 is not satisfied, the flow proceeds to a "check threshold less than maximum" 510 for further processing.

The "check threshold less than maximum" 510 provides the control processor 110 to check whether there are any thresholds that have not been used to read the user data 108. If all of the possible thresholds have been used to attempt recovery of the user data 108, the flow proceeds to the "XOR RAID recovery" 514 as described above. If however there are additional values of the read threshold 122 that have not yet been attempted, the flow proceeds to a "step to next threshold" 512.

The "step to next threshold" 512 provides the control processor 110 to establish the next value of the read threshold 122 as the current value of the read threshold 122 for further processing. The flow will then proceed to the "read user data with a current read threshold" 504 to attempt the reading of the user data 108. It is understood that at any time the control processor 110 can detect the user data 108 correctly read or the sector balanced 216 activated to forego the remainder of the read retries of the uncorrectable error 132. This early termination of the read retries can allow the control processor 110 to take other steps to recover the user data 108 without degrading the performance of the storage system 100 of FIG. 1 or further shifting the used data distribution 406 of FIG. 4.

It has been discovered that the storage system 100 can increase performance of the non-volatile storage array 102 when accessing the user data 108. The application of the optimal read threshold set 128 can minimize the likelihood of detecting the uncorrectable error 132 of FIG. 1 when accessing the sector 0 116 through the sector N 118 of the physical block 114. It is understood that each of the physical block 114 in the non-volatile storage array 102 can have a different set of values for the optimal read threshold set 128. When the optimal read threshold set 128 activates the sector balanced 216 or correctly read the user data 108, the processing can be complete and the data recovered through the last used of the read threshold 122 or through the XOR engine 134.

Figure 6:
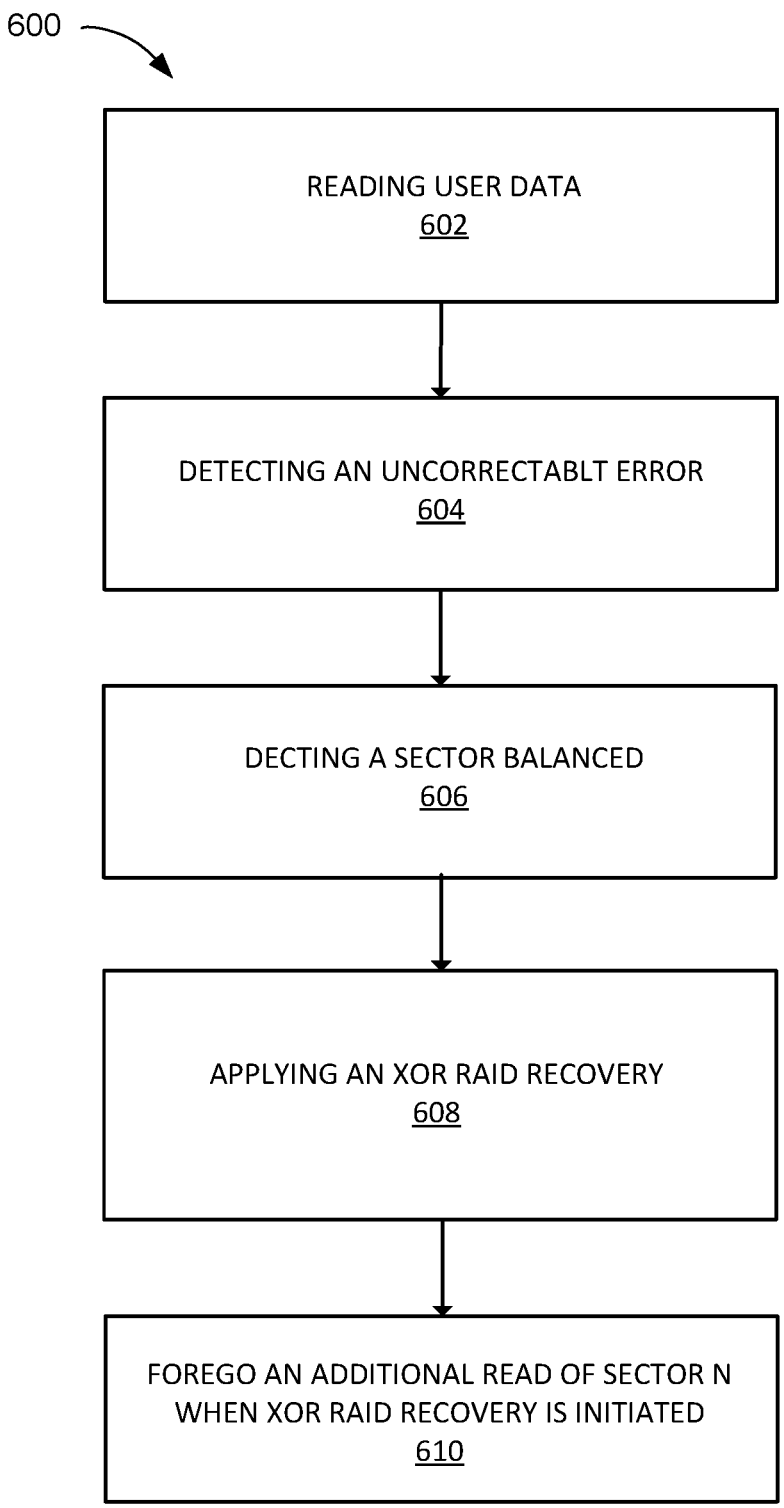
FIG. 6 is a flow chart of a method of operation of a storage system in an embodiment of the present invention.

Referring now to FIG. 6, therein is shown a flow chart of a method 600 of operation of a storage system 100 in an embodiment of the present invention. The method 600 includes: reading user data from a non-volatile memory array using a read threshold in a block 602; detecting an uncorrectable error in the user data, in a block 604; detecting a sector balanced when the number of 1's and 0's in the user data is within the difference stored in a range register, in a block 606; applying an XOR RAID recovery to correct the uncorrectable error in the user data, in a block 608; and terminating an additional read of a sector N with a different value of the read threshold when the sector balanced initiates the XOR RAID recovery, in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level. While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A storage system comprising:
   a control processor, configured to:
   read user data with a read threshold,
   detect an uncorrectable error in the user data,
   detect a sector balanced when the number of 1's and 0's in the user data is within a residual count stored in a range register, apply an XOR RAID recovery to correct the uncorrectable error in the user data; and a non-volatile memory array, coupled to the control processor, configured to store the user data; and wherein the control processor is further configured to forego an additional read of a sector N with a different value of the read threshold when the sector balanced initiates the XOR RAID recovery.

2. The system as claimed in claim 1 wherein the control processor is further configured to load a data select bus to select one of a sector 0 through the sector N when recovering from the uncorrectable error.

3. The system as claimed in claim 1 wherein the control processor is further configured to select the read threshold from an optimal read threshold set when processing the uncorrectable error.

4. The system as claimed in claim 1 wherein the control processor is further configured to load a register array with the user data from a sector 0 through the sector N for processing the XOR RAID recovery.

5. The system as claimed in claim 1 wherein the control processor is further configured to generate a RAID parity sector 0-N when writing a physical block with the user data.

6. The system as claimed in claim 1 wherein the control processor is further configured to load a residual count in a range register in a 1 and 0 counter to activate a detection of the sector balanced.

7. The system as claimed in claim 1 wherein the control processor is configured to reduce the number of reads of the sector N using the different value of the read threshold when correcting the uncorrectable error.

8. A method of operation of a storage system comprising:
reading user data from a non-volatile memory array using a read threshold;
detecting an uncorrectable error in the user data;
detecting a sector balanced when the number of 1's and 0's in the user data is within difference stored in a range register;
applying an XOR RAID recovery to correct the uncorrectable error in the user data; and
foregoing an additional read of a sector N with a different value of the read threshold when the sector balanced initiates the XOR RAID recovery.

9. The method as claimed in claim 8 further comprising selecting one of a sector 0 through the sector N when recovering from the uncorrectable error.

10. The method as claimed in claim 8 further comprising selecting the read threshold from an optimal read threshold set when processing the uncorrectable error.

11. The method as claimed in claim 8 further comprising loading a register array with the user data from a sector 0 through the sector N for processing the XOR RAID recovery.

12. The method as claimed in claim 8 further comprising generating a RAID parity sector 0-N when writing a physical block with the user data.

13. The method as claimed in claim 8 further comprising loading a residual count in a range register in 1 and 0 counter to activate a detection of the sector balanced.

14. The method as claimed in claim 8 further comprising reducing the number of reads of the sector N using a different value of the read threshold when correcting the uncorrectable error.

15. A non-transitory computer readable medium including instructions for execution, the medium comprising:
reading user data from a non-volatile memory array using a read threshold;
detecting an uncorrectable error in the user data;
detecting a sector balanced when the number of 1's and 0's in the user data is within a difference stored in a range register;
applying an XOR RAID recovery to correct the uncorrectable error in the user data; and
foregoing an additional read of a sector N with a different value of the read threshold when the sector balanced initiates the XOR RAID recovery.

16. The medium as claimed in claim 15 further comprising loading a data select bus to select one of a sector 0 through the sector N when recovering from the uncorrectable error.

17. The medium as claimed in claim 15 further comprising selecting the read threshold from an optimal read threshold set when processing the uncorrectable error.

18. The medium as claimed in claim 15 further comprising loading a register array with the user data from a sector 0 through the sector N for processing the XOR RAID recovery.

19. The medium as claimed in claim 15 further comprising generating a RAID parity sector 0-N when writing a physical block with the user data.

20. The medium as claimed in claim 15 further comprising loading a residual count in a range register in a 1 and 0 counter to activate a detection of the sector balanced.

* * * * *

UNITED STATES PATENT AND TRADEMARK OFFICE
CERTIFICATE OF CORRECTION

PATENT NO. : 10,915,399 B2
APPLICATION NO. : 16/440588
DATED : February 9, 2021
INVENTOR(S) : Jun Tao et al.

Page 1 of 1

It is certified that error appears in the above-identified patent and that said Letters Patent is hereby corrected as shown below:

In the Claims

Column 11, Claim 8, Line 38, delete "user data is within difference," and insert therefor --user data is within a difference--

Column 12, Claim 13, Line 11, delete "range register in 1 and 0," and insert therefor --range register in a 1 and 0--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*